United States Patent
Isobe et al.

(10) Patent No.: US 7,414,800 B2
(45) Date of Patent: Aug. 19, 2008

(54) SOLID IMMERSION LENS HOLDER

(75) Inventors: Yoshio Isobe, Hamamatsu (JP); Hiroshi Tanabe, Hamamatsu (JP); Ikuo Arata, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 324 days.

(21) Appl. No.: 11/333,554

(22) Filed: Jan. 18, 2006

(65) Prior Publication Data

US 2006/0182001 A1    Aug. 17, 2006

(30) Foreign Application Priority Data

Jan. 19, 2005    (JP)    .......................... P2005-012103

(51) Int. Cl.
*G02B 7/02*    (2006.01)

(52) U.S. Cl. ...................... 359/811; 359/819

(58) Field of Classification Search .............. 359/811, 359/812, 813, 814, 818, 819, 821, 822, 827

See application file for complete search history.

(56) References Cited

U.S. PATENT DOCUMENTS

| | | | |
|---|---|---|---|
| 4,477,155 A | 10/1984 | Sato et al. | |
| 5,764,613 A | 6/1998 | Yamamoto et al. | |
| 5,939,709 A | 8/1999 | Ghislain et al. | |
| 5,940,545 A | 8/1999 | Kash et al. | |
| 6,594,086 B1 | 7/2003 | Pakdaman et al. | |
| 6,621,275 B2 | 9/2003 | Cotton et al. | |
| 6,828,811 B2 | 12/2004 | Hanson et al. | |
| 6,961,672 B2 | 11/2005 | Kasapi | |
| 2001/0053117 A1 | 12/2001 | Ichimura et al. | |
| 2005/0030051 A1 | 2/2005 | Hanson et al. | |
| 2005/0094258 A1 | 5/2005 | Tanabe et al. | |
| 2005/0094293 A1 | 5/2005 | Tanabe et al. | |
| 2006/0109562 A1 | 5/2006 | Arata et al. | |

FOREIGN PATENT DOCUMENTS

JP    2000-171611    6/2000

(Continued)

*Primary Examiner*—Timothy J Thompson
(74) *Attorney, Agent, or Firm*—Drinker Biddle & Reath LLP

(57) ABSTRACT

A solid immersion lens holder 8A is provided with a base part 50 attached to an objective lens 21, and a lens holding part 60 provided with the base part 50, extending in a direction of optical axis L of the objective lens 21, and arranged to hold a solid immersion lens 6 at an end portion thereof. The lens holding part holds the solid immersion lens so that light emerging from the solid immersion lens to the base part side travels through a region outside the lens holding part and toward the base part, and the base part has a light passing portion 53 which transmits the light toward the objective lens. Since the lens holding part extends in the direction of the optical axis L of the objective lens, even in a case where an observation object 11 is observed as located on a bottom surface of recess 13, the lens holding part will be prevented from contacting a side wall 13a of the recess. As a result, it becomes feasible to observe the observation object up to a region closer to the vicinity of peripheral part 11a of the observation object. This provides a solid immersion lens holder allowing observation up to a region closer to a peripheral part of an observation object even in a case where the observation object is set in a recess of a sample.

13 Claims, 13 Drawing Sheets

FOREIGN PATENT DOCUMENTS

| | | |
|---|---|---|
| JP | 2001-034998 | 2/2001 |
| JP | 2003-181672 | 7/2003 |
| WO | WO 00/79313 | 12/2000 |
| WO | WO 2005/043210 | 5/2005 |

SOLID IMMERSION LENS HOLDER

BACKGROUND OF THE INVENTION

1. Field of the Invention

The present invention relates to a holder for a solid immersion lens.

2. Related Background Art

A solid immersion lens (SIL) is known as a lens for enlarging an image of an observation object. This solid immersion lens is a lens of a hemispherical shape or a superhemispherical shape called a Weierstrass sphere, and microscopic lens in the size of about 1 mm-5 mm. When this solid immersion lens is set in close contact with a surface of the observation object, the numerical aperture (NA) and magnification both are increased, so as to enable observation with a high spatial resolution.

One of the known techniques for securely keeping this solid immersion lens in close contact with the observation object is, for example, the one described in Document 1: U.S. Pat. No. 6,621,275. In the semiconductor inspection system described in Document 1, the solid immersion lens is mounted through a solid immersion lens holder in front of an objective lens (i.e., on the observation object side). The solid immersion lens holder has a chamber with a valve at an end portion thereof, and houses the solid immersion lens in the chamber. The pressure inside the chamber is regulated through this valve to move the solid immersion lens in the direction of the optical axis thereof to achieve optical coupling between the observation object and the solid immersion lens.

The outer shape of this solid immersion lens holder is a tapered shape the inner diameter of which decreases from the objective lens side toward the solid immersion lens side, and a light beam from the solid immersion lens passes the interior of the solid immersion lens holder to enter the objective lens.

SUMMARY OF THE INVENTION

However, if the solid immersion lens is held by the solid immersion lens holder of the tapered shape with the solid immersion lens at the top as in the semiconductor inspection system described in Document 1, there will arise a problem as described below, where an IC (semiconductor device) as an observation object is housed in a socket or where a mold IC package having an IC molded with resin is inspected.

Namely, for example, in the case of an example in which an IC in a mold IC package (sample) is observed, the IC as a semiconductor device is buried in a plastic mold and, for observing the IC, the mold part is removed to expose the back surface of the IC. In this case, the IC as an observation object is located on a bottom surface of a recess. For this reason, where the solid immersion lens holder is of the tapered shape, there can occur contact (interference) between the side wall of the recess and the outer peripheral surface of the solid immersion lens holder in the vicinity of the peripheral part of the IC. This results in posing a problem that the region near the peripheral part of the IC cannot be observed.

Therefore, an object of the present invention is to provide a solid immersion lens holder permitting observation up to a region closer to the peripheral part of the observation object even in the case where the observation object is placed in a recess of a sample.

In order to solve the above problem, a solid immersion lens holder according to the present invention is a solid immersion lens holder comprising: a base part to be attached to an objective lens; and a lens holding part provided with the base part, extending in a direction of an optical axis of the objective lens, and holding a solid immersion lens at an end portion thereof, wherein the lens holding part holds the solid immersion lens so that light emerging from the solid immersion lens to the base part side travels through a region outside the lens holding part and toward the base part, and wherein the base part has a light passing portion which transmits the light emerging from the solid immersion lens to the base part side, toward the objective lens.

In this case, the light passing portion is formed in the base part and thus the light beam from the solid immersion lens can be securely guided into the objective lens. For this reason, the observation object can be observed even in a state in which the solid immersion lens is held by the lens holding part. Since the solid immersion lens is held by the lens holding part extending in the direction of the optical axis of the objective lens, for example, during observation of the observation object located on a bottom surface of a recess, the lens holding part is prevented from coming into contact with the side wall of the recess even if the solid immersion lens is moved to the vicinity of the peripheral part of the observation object. As a result, it becomes feasible to observe the peripheral part of the observation object.

In a preferred configuration of the above-described solid immersion lens holder, the lens holding part has: a holding member extending in the direction of the optical axis and receiving the solid immersion lens; and a lens cover provided at an end portion of the holding member and having an opening for exposing a bottom surface of the solid immersion lens to the outside; the lens holding part houses the solid immersion lens between the holding member and the lens cover. The bottom surface of the solid immersion lens means a surface to be brought into contact with the observation object. In this configuration, the solid immersion lens is housed between a lens receiver of the holding member, and the lens cover, whereby the solid immersion lens is prevented from slipping off the lens holding part.

In the above-described solid immersion lens holder, preferably, the holding member has a plurality of lens receivers for receiving the solid immersion lens. This permits the solid immersion lens to be held in a stabler state. Since the solid immersion lens is received by the plurality of lens receivers, it is feasible to allow the light to propagate from the solid immersion lens to the base part side, between the lens receivers.

In the above-described solid immersion lens holder, preferably, the plurality of lens receivers are radially arranged with respect to a center line of the holding member. In this configuration, the plurality of lens receivers are arranged apart in the circumferential direction, and thus partially receive the surface of the solid immersion lens on the holding member side. For this reason, the light can be made to securely emerge from the solid immersion lens to the base part side even in a state in which the solid immersion lens is received by the lens receivers.

In a further preferred configuration, the plurality of lens receivers are arranged apart from each other with respect to the center line of the holding member. This enables the light even along the center line of the holding member to enter the objective lens, and it is thus feasible to effectively use the light emerging from the solid immersion lens to the base part side.

In the above-described solid immersion lens holder, preferably, the lens holding part has a clearance with respect to the solid immersion lens. This permits the solid immersion lens to follow the surface shape of the observation object, and it results in bringing the solid immersion lens into closer contact with the observation object.

Furthermore, the light passing portion of the above-described solid immersion lens holder can be an aperture. In this case, preferably, an end of the lens holding part on the base part side is located in the aperture, and the base part has a connecting part for connecting the lens holding part to the base part. In this configuration, the lens holding part and the base part are securely coupled to each other by the connecting part even if the lens holding part is located in the aperture.

The lens holding part of the above-described solid immersion lens holder is preferably provided integrally with the base part. In this case, it becomes easy to produce the solid immersion lens holder.

Furthermore, the light passing portion of the above-described solid immersion lens holder may have a light passing member.

In another configuration, the above-described solid immersion lens holder preferably further comprises a diaphragm provided in the base part and arranged to limit a beam passing the light passing portion. In this case, the observation object can be observed through the use of a beam in a desired size. Since the diaphragm permits us, for example, to change the size of the beam emerging from the objective lens and entering the solid immersion lens, it becomes feasible to regulate the numerical aperture (NA) of the beam entering the observation object, and, as a result, it becomes feasible to observe the observation object with a desired NA.

Preferably, the above-described solid immersion lens holder is configured so as to protect the observation object to be observed through the solid immersion lens, in accordance with a stress exerted on the solid immersion lens.

It is necessary to keep the solid immersion lens in close contact with the observation object during observation of the observation object through the solid immersion lens, but if the solid immersion lens is pressed against the observation object with too high pressure, the observation object can be damaged. When the solid immersion lens is pressed against the observation object, the solid immersion lens receives a reaction force, and it results in exerting a stress on the lens holding part holding the solid immersion lens. For this reason, by protecting the observation object in accordance with the stress exerted on the lens holding part, it is feasible to observe the observation object through the use of the solid immersion lens held by the solid immersion lens holder, without damage to the observation object.

In a further preferred configuration, the above-described solid immersion lens holder further comprises a stress detection sensor for detecting a stress exerted on the solid immersion lens. In this case, the stress detection sensor detects the stress exerted on the lens holding part, and it is thus feasible to keep the solid immersion lens in close contact with the observation object, without damage to the observation object.

Another solid immersion lens holder according to the present invention is a solid immersion lens holder for holding a solid immersion lens to be used in observation of an observation object placed in a recess of a sample, the solid immersion lens holder being attached to an objective lens, holding the solid immersion lens so as to avoid contact with a side wall of the recess during observation of a peripheral part of the observation object, and transmitting light emerging from the solid immersion lens to the objective lens side, toward the objective lens.

Since this configuration permits the light emerging from the solid immersion lens to the objective lens side to be transmitted while the solid immersion lens holder holds the solid immersion lens, it is feasible to observe the observation object. Since the solid immersion lens holder holds the solid immersion lens so as to avoid contact with the side wall of the recess during the observation of the peripheral part of the observation object, it is feasible to securely observe the peripheral part of the observation object located in the recess.

Preferably, a sample observation method by using the solid immersion lens holder is a sample observation method comprising: a first image acquisition step of acquiring an image of an observation object through an optical system; a lens positioning step of positioning, in the optical system, a solid immersion lens and an objective lens to which the solid immersion lens is attached by using a solid immersion lens holder on a position including an optical axis of the optical system; the solid immersion lens holder being attached to the objective lens, holding the solid immersion lens, and configured so as to transmit light emerging from the solid immersion lens to the objective lens side, toward the objective lens; and a second image acquisition step of acquiring an image of the observation object enlarged by the solid immersion lens through the solid immersion lens and the optical system. Here, as for the objective lens used in the image acquisition steps, the identical objective lens may be used in the first and second image acquisition steps. In this case, in the first image acquisition step, the image of the observation object is acquired in a state in which the solid immersion lens holder is removed, and in the second image acquisition step, the enlarged image is acquired in a state in which the solid immersion lens holder is attached to the objective lens. Alternatively, the different objective lenses may be used in the first and second image acquisition steps.

In the above-described sample observation method, it is preferable that the optical system includes a first objective lens, and a second objective lens to which the solid immersion lens is attached by using the solid immersion lens holder; and in the lens positioning step, the solid immersion lens and the second objective lens are positioned on the position including the optical axis of the optical system by changing an objective lens in the optical system from the first objective lens to the second objective lens. In addition, it is preferable that the solid immersion lens holder comprising: a base part to be attached to the objective lens; and a lens holding part provided with the base part, extending in a direction of an optical axis of the objective lens, and holding the solid immersion lens at an end portion thereof, wherein the lens holding part holds the solid immersion lens so that light emerging from the solid immersion lens to the base part side travels through a region outside the lens holding part and toward the base part, and wherein the base part has a light passing portion which transmits the light emerging from the solid immersion lens to the base part side, toward the objective lens, as described above.

The solid immersion lens holder according to the present invention permits us to observe a region closer to the peripheral edge of the observation object even in the case where the observation object is located inside the recess.

DESCRIPTION OF THE PREFERRED EMBODIMENTS

The preferred embodiments of the solid immersion lens holder according to the present invention will be described below with reference to the drawings. The same elements will be denoted by the same reference symbols in each of drawings, without redundant description.

First Embodiment

Figure 1:
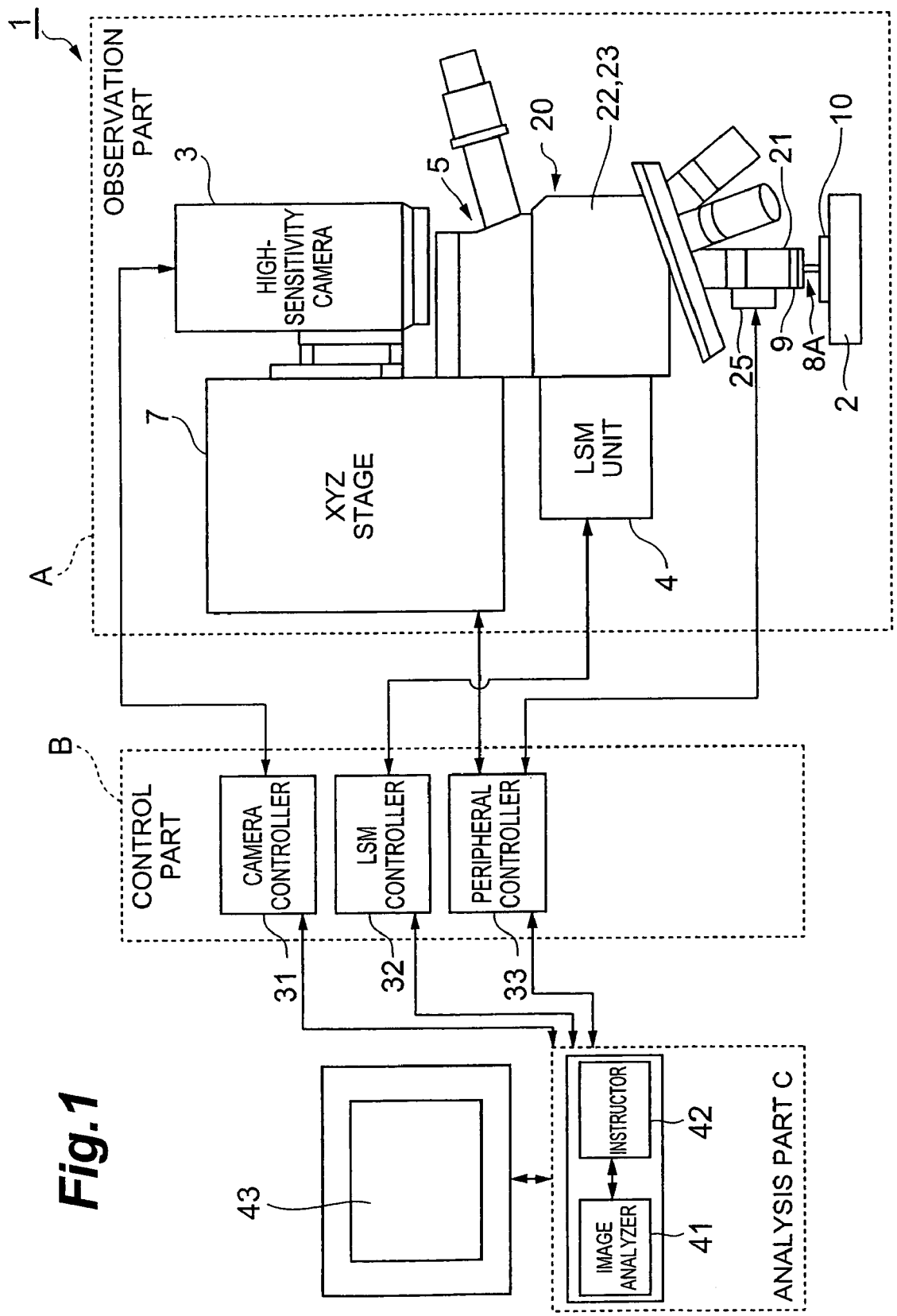
FIG. 1 is a configuration diagram of a semiconductor inspection apparatus to which an embodiment of the solid immersion lens holder according to the present invention is applied.
Figure 2:
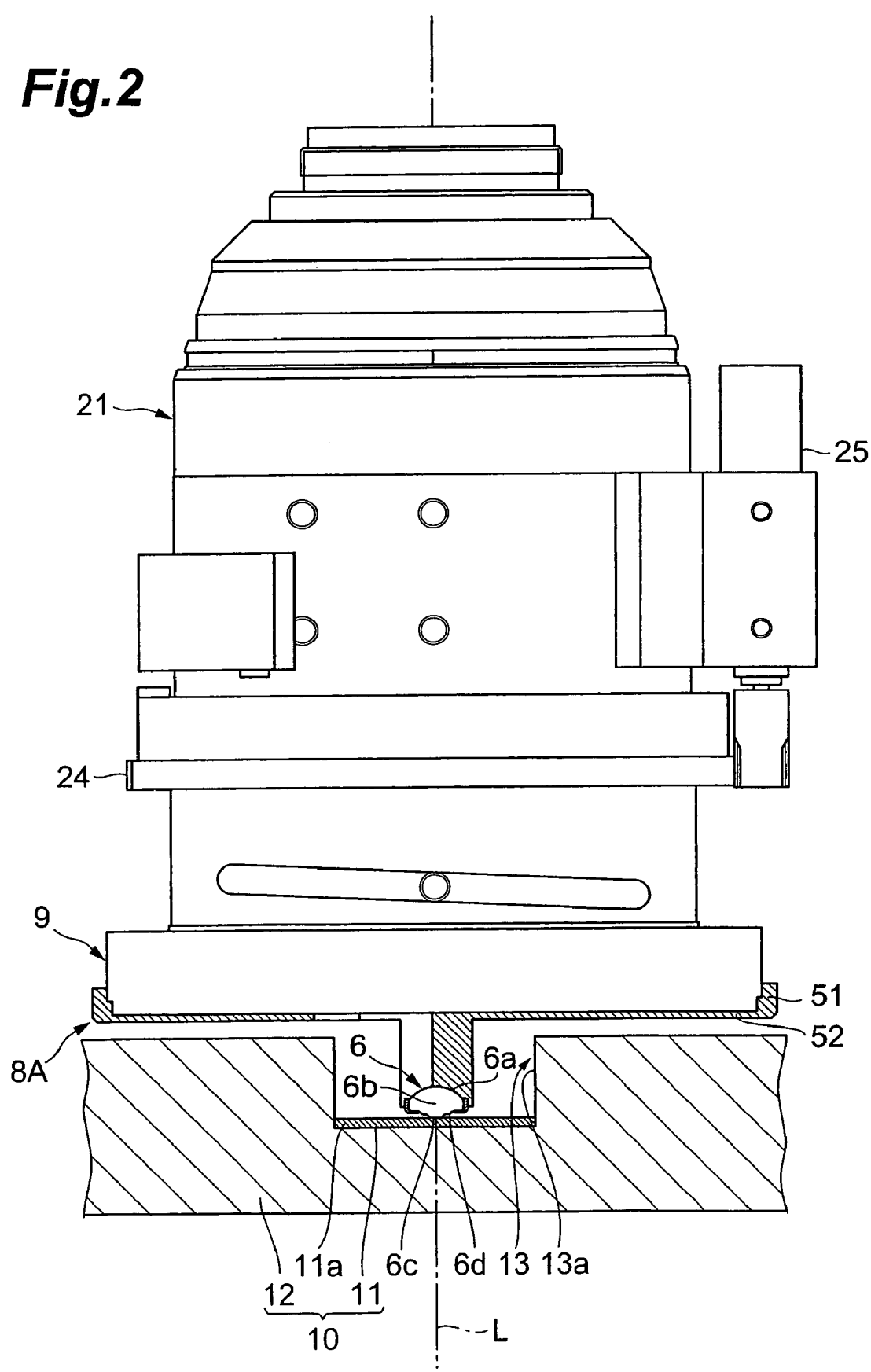
FIG. 2 is a configuration diagram showing a configuration of the solid immersion lens holder.
Figure 3:
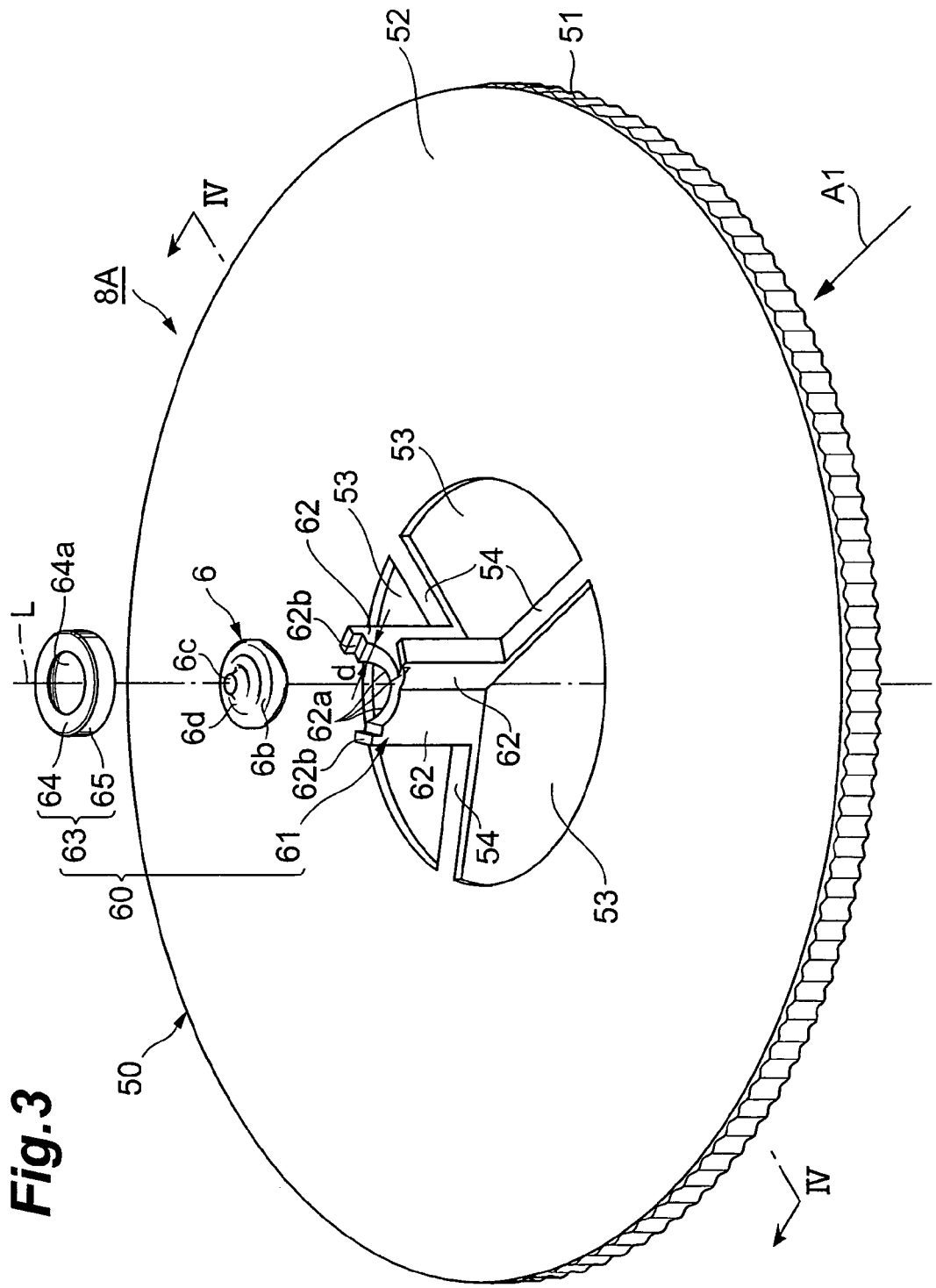
FIG. 3 is an exploded perspective view of the solid immersion lens holder shown in FIG. 2.

FIG. 1 is a configuration diagram showing a semiconductor inspection apparatus provided with the solid immersion lens holder according to the first embodiment of the present invention. FIG. 2 is a configuration diagram showing a configuration of the solid immersion lens holder. FIG. 3 is an exploded perspective view of the solid immersion lens holder. FIG. 4(a) is a sectional view along line IV-IV in FIG. 3, and FIG. 4(b) an enlarged view of an end portion of a lens holding part in the solid immersion lens holder shown in FIG. 4(a). FIG. 2 shows a state in observation of a sample while the solid immersion lens holder is mounted on an objective lens. FIGS. 3, 4(a), and 4(b) show a state in which the solid immersion lens holder holds a solid immersion lens. FIG. 4(b) shows a state in which the solid immersion lens is pressed against an observation object.

As shown in FIGS. 1 and 2, the semiconductor inspection apparatus 1 is, for example, a inspection device that inspects as an observation object a semiconductor device 11 (cf. FIG. 2) in a mold semiconductor device being a sample 10 and that is arranged to acquire an image of the semiconductor device 11 and to inspect internal information thereof.

The "mold semiconductor device" is a device in which the semiconductor device 11 is hermetically sealed as molded with resin 12. The "internal information" includes a circuit pattern of the semiconductor device and very weak emission from the semiconductor device. Examples of this very weak emission include emission from an abnormal part based on a defect of the semiconductor device, transient emission with a switching operation of a transistor in the semiconductor device, and so on. Furthermore, the very weak emission also includes heat generated based on a defect of the semiconductor device.

The sample 10 is mounted on a stage 2 in an observation part A and with the back surface of the semiconductor device 11 facing up, in a state in which the resin 12 is cut away so as to expose the back surface of the semiconductor device 11 buried in the resin 12. Since the back surface of the semiconductor device 11 is exposed by cutting the sample 10 in part away in this manner, the semiconductor device 11 is located on a bottom surface of recess 13 resulting from the cutting of the resin 12. Then the inspection apparatus 1, in the present embodiment, inspects the illustrated lower surface of the semiconductor device 11 (an integrated circuit formed on a front surface of a substrate of semiconductor device 11, or the like).

The semiconductor inspection apparatus 1 is provided with an observation part A for observation of semiconductor device 11, a control part B for control on operations of respective parts in the observation part A, and an analysis part C for processing, instructions, etc. necessary for inspection of semiconductor device 11.

The observation part A is provided with a high-sensitivity camera 3 and a laser scan optic (LSM: Laser Scanning Microscope) unit 4 as image acquiring means for acquiring an image from the semiconductor device 11, an optical system 20 including objective lens 21 of microscope 5 disposed between the high-sensitivity camera 3 and LSM unit 4, and the semiconductor device 11, a solid immersion lens 6 (cf. FIG. 2) for acquiring an enlarged observation image of semiconductor device 11, and an XYZ stage 7 for moving these members each in X-Y-Z directions orthogonal to each other.

The optical system 20 is provided with an optical system 22 for the camera and an optical system 23 for the LSM unit, in addition to objective lens 21. There are a plurality of objective lenses 21 with different magnifications provided so as to be switchable. The objective lens 21 has a correction ring 24 to permit an observer to adjust the correction ring 24 so as to securely achieve focus on a location desired to observe. The camera optical system 22 guides light from the semiconductor device 11 through the objective lens 21, to the high-sensitivity camera 3, and the high-sensitivity camera 3 acquires an image of a circuit pattern or the like of the semiconductor device 11.

On the other hand, the LSM unit optical system 23 reflects an infrared laser beam from the LSM unit 4 toward the objective lens 21 by a beam splitter (not shown) to guide the beam to the semiconductor device 11, and guides the reflected laser beam traveling from the semiconductor device 11 toward the high-sensitivity camera 3 through the objective lens 21, to the LSM unit 4.

This LSM unit 4 emits the infrared laser beam toward the semiconductor device 11 while scanning it in the X-Y directions, and detects the reflected light from the semiconductor device 11 by a photodetector (not shown). The intensity of this detected light is one reflecting the circuit pattern of the semiconductor device 11. Therefore, the LSM unit 4 acquires an image of the circuit pattern of the semiconductor device 11 or the like by the X-Y scan on the semiconductor device 11 with the infrared laser beam.

The XYZ stage 7 is a mechanism for moving the high-sensitivity camera 3, LSM unit 4, optical system 20, solid immersion lens 6, etc. in each of the X-Y directions (horizontal directions; directions parallel to the semiconductor device 11 as an observation object) and the Z-direction (vertical direction) orthogonal to them, according to need.

As shown in FIG. 2, the solid immersion lens 6 is a microscopic lens of hemispherical shape and has a hemispherical part 6b having an upper surface 6a being an input/output surface for light to the outside (e.g., the objective lens of the microscope) and formed in the spherical shape. The solid immersion lens 6 has a convex part 6d that is protruded in the opposite direction to the upper surface 6a side and in the central region of the solid immersion lens 6 and that has a bottom surface 6c formed in planar shape. This bottom surface 6c is a mount surface onto the semiconductor device 11. The solid immersion lens 6 is arranged so that the bottom surface 6c is brought into close contact with an observation position (on the illustrated upper surface) for observation to acquire an enlarged observation image of the front surface (illustrated lower surface) of the semiconductor device 11 being the back side. Specifically, the solid immersion lens used in the semiconductor inspection apparatus is made of a high-index material having a refractive index substantially equal to or close to the refractive index of the substrate material of the semiconductor device. Typical examples of the material include Si, GaP, GaAs, and so on.

The microscopic optical element as described above is kept in optically close contact with the surface of the substrate of the semiconductor device, whereby the semiconductor substrate itself is used as a part of the solid immersion lens. In a back surface analysis of the semiconductor device with the solid immersion lens, when the focus of the objective lens is matched with the integrated circuit formed on the front surface of the semiconductor substrate, the effect of the solid immersion lens enables a beam with a high NA to pass in the substrate, and the apparatus is expected to achieve a high resolution.

The lens shape of the solid immersion lens 6 as described above is determined depending upon conditions for elimination of aberration. In the case of the solid immersion lens 6 having the hemispherical shape, the focus thereof is at the center of the sphere. In this case, the numerical aperture (NA) and magnification both are multiplied by n. The shape of the solid immersion lens 6 does not have to be limited to the hemispherical shape, but may be, for example, the Weierstrass shape.

The solid immersion lens holder 8A is one suitably holding the solid immersion lens 6 relative to the objective lens 21 and is attached through an objective lens socket 9 to the objective lens 21. This solid immersion lens holder 8A will be described later in detail. The objective lens socket 9 is provided at the end portion of the objective lens 21 and is used for mounting the solid immersion lens holder 8A on the objective lens 21. In a state in which the solid immersion lens holder 8A is mounted on the objective lens 21, the objective lens socket 9 is arranged to pass light inside thereof so as to permit observation of the semiconductor device 11.

The control part B is provided with a camera controller 31, a laser scan (LSM) controller 32, and a peripheral controller 33. The camera controller 31 and LSM controller 32 control respective operations of the high-sensitivity camera 3 and the LSM unit 4, thereby controlling execution of observation of the semiconductor device 11 (acquisition of an image), setting of observation conditions, etc. performed in the observation part A.

The peripheral controller 33 controls the operation of the XYZ stage 7, thereby controlling movement, positioning, focusing, etc. of the high-sensitivity camera 3, LSM unit 4, optical system 20, etc. to positions corresponding to the observation position of the semiconductor device 11. In addition, the peripheral controller 33 drives a motor 25 for adjustment of the correction ring attached to the objective lens 21, so as to adjust the correction ring 24.

The analysis part C is provided with an image analyzer 41 and an instructor 42 and is constructed of a computer. The image analyzer 41 executes analysis processes and others necessary for image information from the camera controller 31 and from the LSM controller 32, and the instructor 42 refers to an entry entered by an operator, analysis contents by the image analyzer 41, etc. to give necessary instructions about execution of inspection of the semiconductor device 11 in the observation part A, through the control part B. An image, data, or the like acquired or analyzed by the analysis part C is displayed on a display unit 43 connected to the analysis part C, according to need.

Next, the solid immersion lens holder 8A, which is the feature of the present embodiment, will be detailed in particular. In the description below, the side of objective lens 21 relative to the solid immersion lens 6 will be referred to as the upper side and the side of sample 10 as the lower side, for simplification of description.

Figure 4:
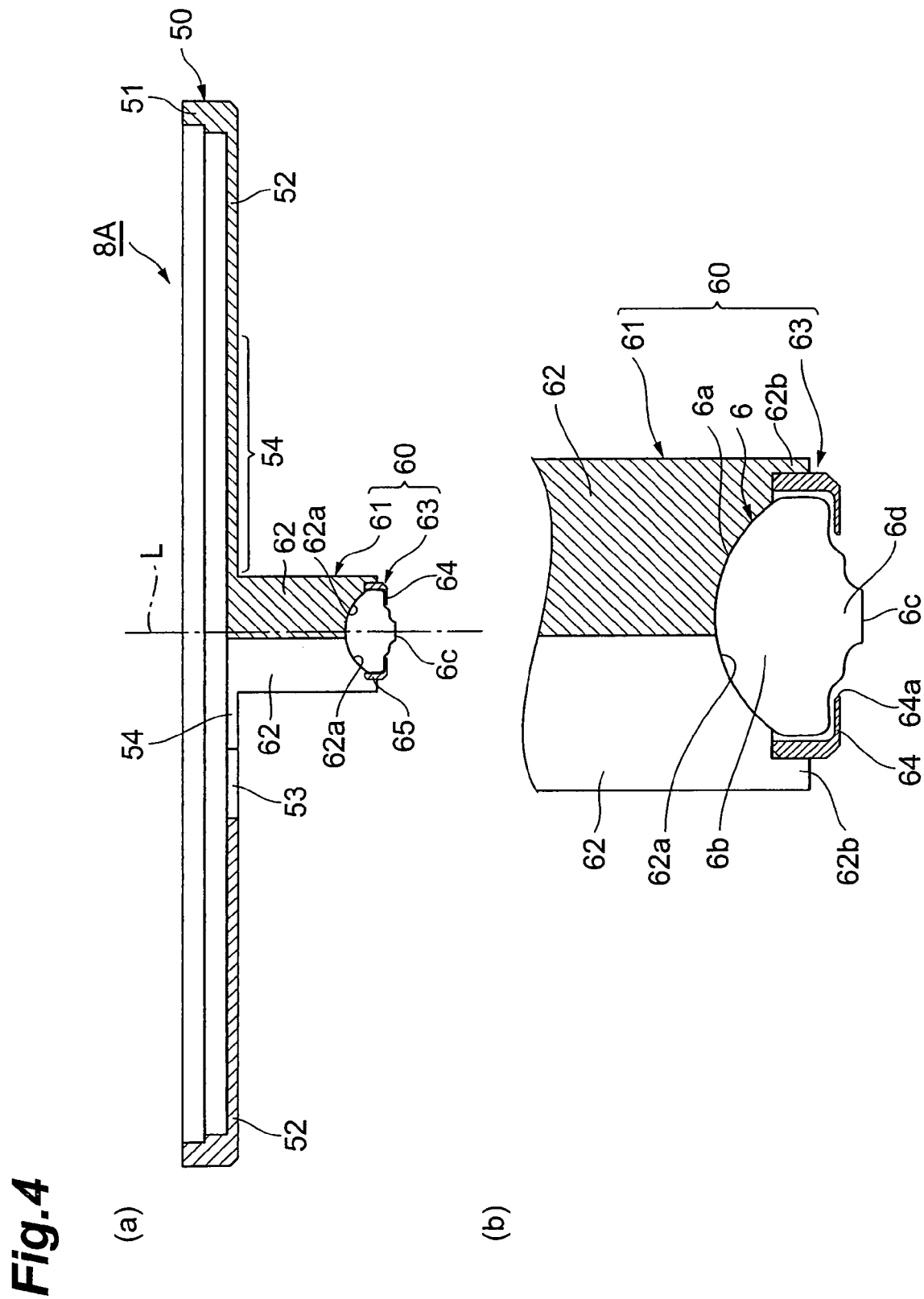
FIG. 4 is a sectional view along line IV-IV in FIG. 3.

As shown in FIGS. 3 and 4, the solid immersion lens holder 8A is constructed so that a lens holding part 60 extends from a center of a base part 50 of disk shape and in a direction substantially perpendicular to the base part 50, and the outer shape thereof is of substantially T-shape, when viewed from a direction of arrow A1 in FIG. 3.

The base part 50 has a peripheral wall 51 for screwing with the objective lens socket 9 (cf. FIG. 2) and the base part 50 is engaged with the objective lens socket 9 to mount the solid immersion lens holder 8A so that the center of the base part 50 is located on the optical axis L of the objective lens 21. This results in permitting the position of the solid immersion lens 6 held by the solid immersion lens holder 8A to be adjusted through driving of the XYZ stage 7. The outer surface of the peripheral wall 51 is knurled so as to facilitate mounting of the base part 50 on the objective lens socket 9.

A bottom plate 52 of the base part 50 has three apertures 53, 53, 53 as light passing portions for letting a light beam pass. Each aperture 53 passes the light from the LSM unit 4 toward the solid immersion lens 6 and passes the light reflected by the semiconductor device 11 and emerging from the solid immersion lens 6, toward the objective lens 21.

Each aperture 53 is approximately sector-shaped and the apertures 53 are arranged concentrically with each other with respect to the center of the base part 50 and at equal intervals in the circumferential direction. This results in forming three connecting parts 54, 54, 54 for connecting the lens holding part 60 to the bottom plate 52, at equal intervals between adjacent apertures 53, 53. In other words, the base part 50 has the connecting parts 54, 54, 54 traversing a circular aperture formed concentrically with the center of the bottom plate 52 and connecting the bottom plate 52 to the lens holding part 60. The three connecting parts 54, 54, 54 radially extend from the center of the base part 50.

The lens holding part 60 has a holding member 61 extending from the intersecting part among the connecting parts 54, 54, 54 and in a direction substantially perpendicular to the base part 50. The holding member 61 is comprised of three holding pieces 62, 62, 62 located on the respective connecting parts 54, 54, 54 and serving as lens receivers for receiving the solid immersion lens 6.

The holding pieces 62, 62, 62 are radially arranged with respect to the center line of the holding member 61 (more specifically, in the Y-shape) and each holding piece 62 has a tapered shape the width d of which decreases toward the center line of the holding member 61 (in other words, toward the inside). This can achieve more reduction in the quantity of light blocked by the holding piece 62 among the light entering or leaving the upper surface 6a of the solid immersion lens 6. The length of the holding piece 62 in the direction of the optical axis L is longer than the depth of the recess 13 of the sample 10 (the length in the direction of the optical axis L). This permits the apparatus to observe the semiconductor device 11 located on the lower surface of the recess 13 of the sample 10, in a state in which the solid immersion lens holder 8A holds the solid immersion lens 6.

The holding pieces 62, 62, 62 and the base part 50 are integrally formed, for example, with a resin so that the center line of the holding member 61 passes the center of the base part 50. This matches the optical axis L of the objective lens 21 with the center line of the holding member 61. For this reason, the center line of the holding member 61 will also be denoted by symbol L in the description hereinafter.

The holding pieces 62, 62, 62 have their respective lens receiving surfaces 62a, 62a, 62a formed at the end portion thereof (i.e., at the end on the opposite side to the base part 50) and having a curvature equal to that of the upper surface 6a of the solid immersion lens 6, and the holding member 61 receives the solid immersion lens 6 by the three lens receiving surfaces 62a. This permits the holding member 61 to stably receive the solid immersion lens 6. In addition, a claw 62b for fixing a lens cover 63 of cylindrical shape is formed at the end portion of each holding piece 62, 62, 62.

The lens cover 63 has a bottom plate 64, and the peripheral part of the bottom plate 64 is provided with a peripheral wall 65 to be engaged with the claws 62b. The inner diameter of the peripheral wall 65 is larger than the outer diameter of the solid immersion lens 6. The bottom plate 64 has an opening 64a for letting the bottom surface 6c of the solid immersion lens 6 project to the outside (toward the sample 10), and the diameter of this opening 64a (cf. FIG. 4(b)) is larger than the outer diameter of the bottom surface 6c part in the solid immersion lens 6.

In this configuration, after the solid immersion lens 6 is placed between the lens receiving surfaces 62a and the lens cover 63, the lens cover 63 is fixed to the holding member 61 with an adhesive or the like, whereby the solid immersion lens 6 is housed in a state in which the bottom surface 6c projects out of the opening 64a, between the lens receiving surfaces 62a and the lens cover 63. This prevents the solid immersion lens 6 from slipping off the lens holding part 60.

In a state in which the lens cover 63 is fixed to the holding member 61, the space for housing of the solid immersion lens 6 created by the bottom plate 64 and the three lens receiving surfaces 62a is larger than the hemispherical part 6b of the solid immersion lens 6. Therefore, the lens holding part 60 has a play relative to the solid immersion lens 6 and, in other words, has a clearance (space).

For this reason, during observation of the semiconductor device 11, the solid immersion lens 6 can swing so that the solid immersion lens 6 follows the surface shape of the semiconductor device 11; for example, the semiconductor device 11 can be observed even in a case where the semiconductor device 11 is inclined relative to the optical axis L. Furthermore, the degree of close contact is improved between the solid immersion lens 6 and the semiconductor device 11. In addition, even if the solid immersion lens 6 swings in this manner, the position of observation with the solid immersion lens 6 agrees with the center of the sphere, so as not to affect the observation.

The following will describe an example of a sample observation method of acquiring an image of the semiconductor device 11 with the semiconductor inspection apparatus 1.

First, an objective lens (first objective lens) 21 without the solid immersion lens 6, out of the plurality of objective lenses 21 in the optical system 20 of the microscope 5, is positioned on the position including the optical axis of the optical system 20. Then, the image of the semiconductor device 11 is acquired through the optical system 20 (first image acquisition step), and a position for observation of the semiconductor device 11 with the solid immersion lens 6 is specified. This operation of specifying the observation position is carried out by driving the XYZ stage 7 through the peripheral controller 33 by the instructor 42.

After the specifying operation of the observation position, the objective lens is changed to an objective lens (second objective lens) 21 with the solid immersion lens holder 8A and observation is carried out therewith. Specifically, in the optical system 20, the solid immersion lens 6 and the objective lens 21 to which the solid immersion lens 6 is attached by using the solid immersion lens holder 8A is positioned on a position including the optical axis of the optical system 20; the solid immersion lens holder 8A being attached to the objective lens 21, holding the solid immersion lens 6, and configured so as to transmit light emerging from the solid immersion lens 6 to the objective lens 21 side, toward the objective lens 21 (lens positioning step). Then, the image of the semiconductor device 11 enlarged by the solid immersion lens 6 is acquired through the solid immersion lens 6 and the optical system 20 (second image acquisition step). On this occasion, the instructor 42 adjusts the correction ring 24 to an appropriate position by driving the correction ring adjustment motor 25 through the peripheral controller 33 in accordance with the characteristics of the solid immersion lens 6 held by the solid immersion lens holder 8A (the thickness of the solid immersion lens 6, the refractive index thereof, etc.), the thickness of the substrate of the semiconductor device 11, the material of the substrate, and so on.

The instructor 42 drives the XYZ stage 7 through the peripheral controller 33 in accordance with the characteristics of the solid immersion lens 6 and others to press the solid immersion lens 6 against the semiconductor device 11 to achieve close contact. The instructor 42 also drives the XYZ stage 7 through the peripheral controller 33 to bring the objective lens 21 in focus. When the solid immersion lens 6 is in close contact with the semiconductor device 11 in this manner, the solid immersion lens 6 is pushed toward the lens receiving surface 62a side by the semiconductor device 11, and thus the upper surface 6a comes into contact with the lens receiving surfaces 62a (cf. FIG. 4(b)).

In the in-focus state of the objective lens 21, the instructor 42 then executes observation of the semiconductor device 11 by use of the LSM unit 4, high-sensitivity camera 3, etc. through the LSM controller 32 and the camera controller 31.

In this observation, the infrared laser beam outputted from the LSM unit 4 is outputted through the objective lens 21 and toward the sample 10. The light outputted from the objective lens 21 passes through the apertures 53 of the base part 50, enters the solid immersion lens 6 from the upper surface 6a thereof, and is outputted toward the semiconductor device 11. Then light (reflected light) reflected from the semiconductor device 11 under irradiation with the infrared laser beam is again incident to the solid immersion lens 6 and is outputted from the upper surface 6a of the solid immersion lens 6. More specifically, the reflected light from the semiconductor device 11 is outputted from the portions of the upper surface 6a not contacting the lens receiving surfaces 62a.

The reflected light emerging from this solid immersion lens 6 propagates through a region outside the lens holding part 60 (including the space between adjacent holding pieces 62) toward the base part 50. Then the light travels through the apertures 53 of the base part 50 to enter the objective lens 21. The reflected light entering the objective lens 21 is guided to the high-sensitivity camera 3 by the camera optical system 22, and the high-sensitivity camera 3 acquires an image of the circuit pattern of the semiconductor device 11 or the like. In this semiconductor inspection apparatus 1, the solid immersion lens 6 can be replaced by changing the solid immersion lens holder 8A with another. In this case, the lens replacement is easy because there is no need for directly handling the small solid immersion lens 6.

Since the whole solid immersion lens holder 8A is changed with another during the lens replacement as described above, it is preferable to form a notch or the like as a mark for discriminating the solid immersion lens 6 held by the lens holding part 60, in the holding pieces 62 of the holding member 61. This permits the operator to readily know the characteristics of the solid immersion lens 6 (refractive index, thickness, etc.) held by the solid immersion lens holder 8A, by only a look at the solid immersion lens holder 8A. Other marks for discriminating the solid immersion lens 6 can be, for example, different colors for the lens holding part 60.

For inspecting the semiconductor device 11 of the sample 10 with use of the semiconductor inspection apparatus 1, as described above, it is important for the lens holding part 60 of the solid immersion lens holder 8A to extend in the direction of the optical axis L of the objective lens 21 (in the direction approximately perpendicular to the base part 50) and for the solid immersion lens holder 8A to have the approximately T-shape.

Namely, since the lens holding part 60 extends in the direction of the optical axis L of the objective lens 21, the lens holding part 60 is approximately parallel to the side wall 13a of the recess 13 (cf. FIG. 2). For this reason, the lens holding part 60 is unlikely to interfere (in other words, contact) with the side wall 13a of the recess 13 even if the solid immersion lens 6 is moved to near the peripheral part of the semiconductor device 11 provided on the lower surface of the recess 13. As a result, the observation can be conducted while the solid immersion lens 6 is located closer to the peripheral part 11a of the semiconductor device 11 positioned in the recess 13. In order to allow the lens holding part 60 to be located closer to the vicinity of the side wall 13a of the recess 13, the outside diameter of the lens holding part 60 is preferably slightly larger than the outside diameter of the solid immersion lens 6.

In the solid immersion lens holder 8A, since the upper surface 6a of the solid immersion lens 6 is partly received by the three holding pieces 62 radially arranged with respect to the center line L of the holding member 61, light can be securely inputted or outputted from the portions out of contact with the holding pieces 62 in the upper surface 6a of the solid immersion lens 6 even if the lens holding part 60 extending in the direction of the optical axis L holds the solid immersion lens 6.

Since the base part 50 has the apertures 53, the light (infrared laser beam) from the LSM unit 4 can be guided well into the solid immersion lens 6 and the light from the solid immersion lens 6 can also be guided well into the objective lens 21 even if the solid immersion lens holder 8A is mounted on the objective lens 21.

Furthermore, since the solid immersion lens holder 8A is mounted on the objective lens 21, the position of the solid immersion lens 6 can be adjusted by moving the objective lens 21 by the XYZ stage 7. For observing the semiconductor device 11, the objective lens 21 is moved in the direction of the optical axis L of the objective lens 21, whereby the solid immersion lens 6 is brought into close contact with the semiconductor device 11. Therefore, for example, even in a case where the solid immersion lens holder 8A is applied to an inverted microscope, as well as the erecting microscope 5 as shown in FIG. 1, the solid immersion lens 6 can be securely kept in close contact with the semiconductor device 11.

Second Embodiment

Figure 5:
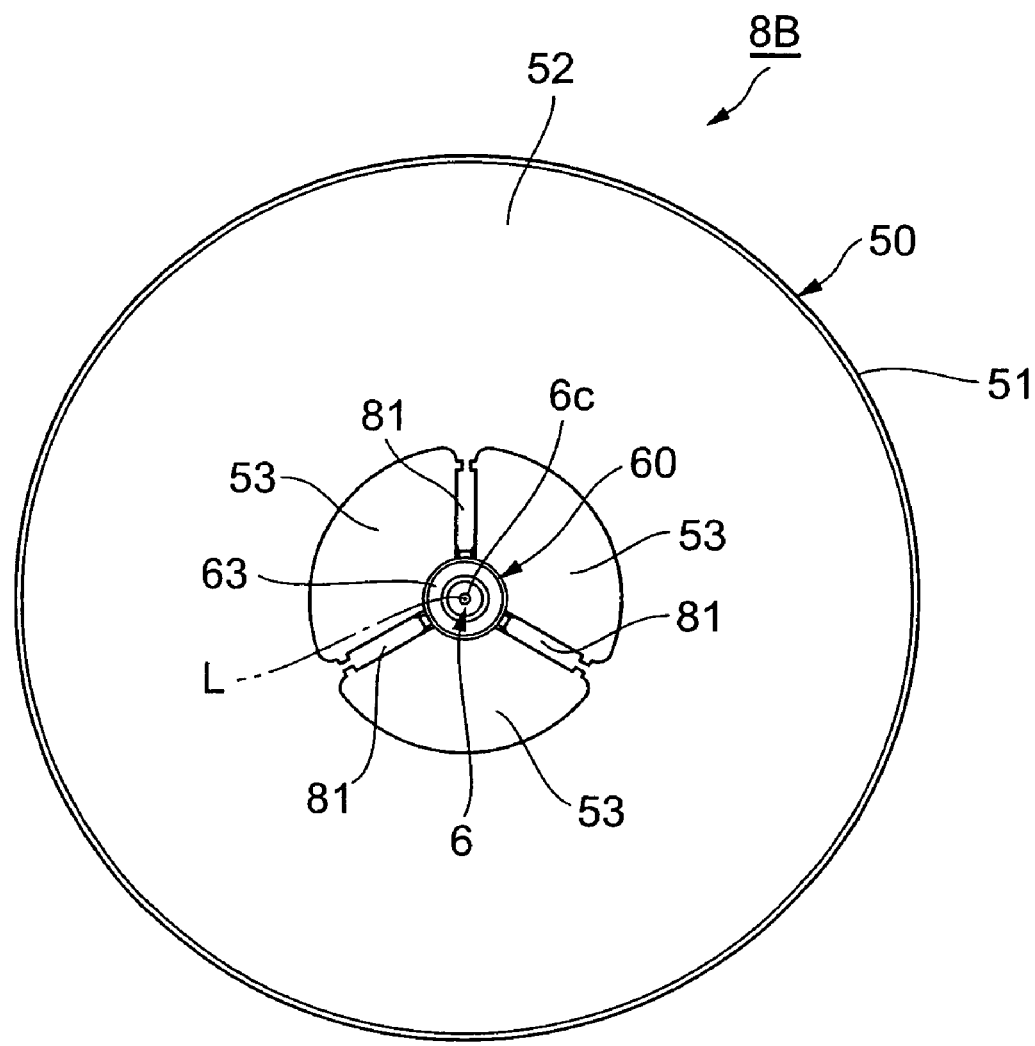
FIG. 5 is a bottom view of the solid immersion lens holder according to the second embodiment.

FIG. 5 is a bottom view of solid immersion lens holder 8B according to the second embodiment. FIG. 5 shows a state in which the solid immersion lens holder 8B holds a solid immersion lens 6.

The configuration of the solid immersion lens holder 8B is different from the configuration of the solid immersion lens holder 8A shown in FIG. 3, in that the width of connecting parts 81, 81, 81 is narrowed in part in the extending direction of each connecting part 81 (i.e., in the radial directions of the base part 50). The solid immersion lens holder 8B will be described with focus on this point.

Since the width of the connecting parts 81 is narrowed in part, the connecting parts 81 will be broken if a predetermined stress is exerted through the solid immersion lens 6 or the like on the holding member 61.

Since the solid immersion lens 6 has to be brought into close contact with the semiconductor device 11 in order to observe the semiconductor device 11 through the solid immersion lens 6, the solid immersion lens 6 is pressed against the semiconductor device 11. In this case, for example, if the solid immersion lens 6 is pushed too hard, the semiconductor device 11 might be damaged. This is also the case in the operation of moving the solid immersion lens 6 for scan on the semiconductor device 11.

In contrast to it, the width of the connecting parts 81 is narrowed in part in the configuration of the solid immersion lens holder 8B, and when the solid immersion lens 6 is pushed against the semiconductor device 11, the connecting parts 81, 81, 81 break before damage to the semiconductor device 11, so as to result in first breaking the solid immersion lens holder 8B.

Describing it in more detail, when the solid immersion lens 6 is pressed against the semiconductor device 11, the solid immersion lens 6 receives a force as reaction from the semiconductor device 11. As a result, a stress is exerted on the holding member 61 in contact with the upper surface 6a of the solid immersion lens 6, whereupon the stress is applied to the connecting parts 81 provided integrally with the holding member 61. The connecting parts 81 break when the stress exceeds a predetermined value. For this reason, the semiconductor device 11 is prevented from receiving a load over a certain level during inspection of the semiconductor device 11, whereby the semiconductor device 11 is prevented from being damaged.

Namely, the solid immersion lens holder 8B has the configuration for protecting the semiconductor device 11 as an observation object in accordance with the stress exerted on the lens holding part 60 during observation, based on the width of the connecting parts 81 narrowed in part. The width of the narrowed portions in the connecting parts 81 can be determined so that the connecting parts 81 can break before damage to the semiconductor device 11 in accordance with the stress exerted on the connecting parts 81.

The effect of the configuration wherein the holding member 61 extends in the direction of the optical axis L of the objective lens 21 is much the same as in the case of the first embodiment. Namely, since the lens holding part 60 is unlikely to contact the side wall 13a of the recess 13 (cf. FIG. 2), it becomes feasible to move the lens holding part 60 up to the vicinity of the side wall 13a of recess 13. As a result, the peripheral part 11a of the semiconductor device 11 can be observed.

The present embodiment adopted the configuration wherein the width of the connecting parts 81 was narrowed, but it is also possible to adopt, for example, a configuration wherein the thickness of connecting parts 81 (the length in the direction perpendicular to the bottom plate 52) is decreased in part.

Third Embodiment

Figure 6:
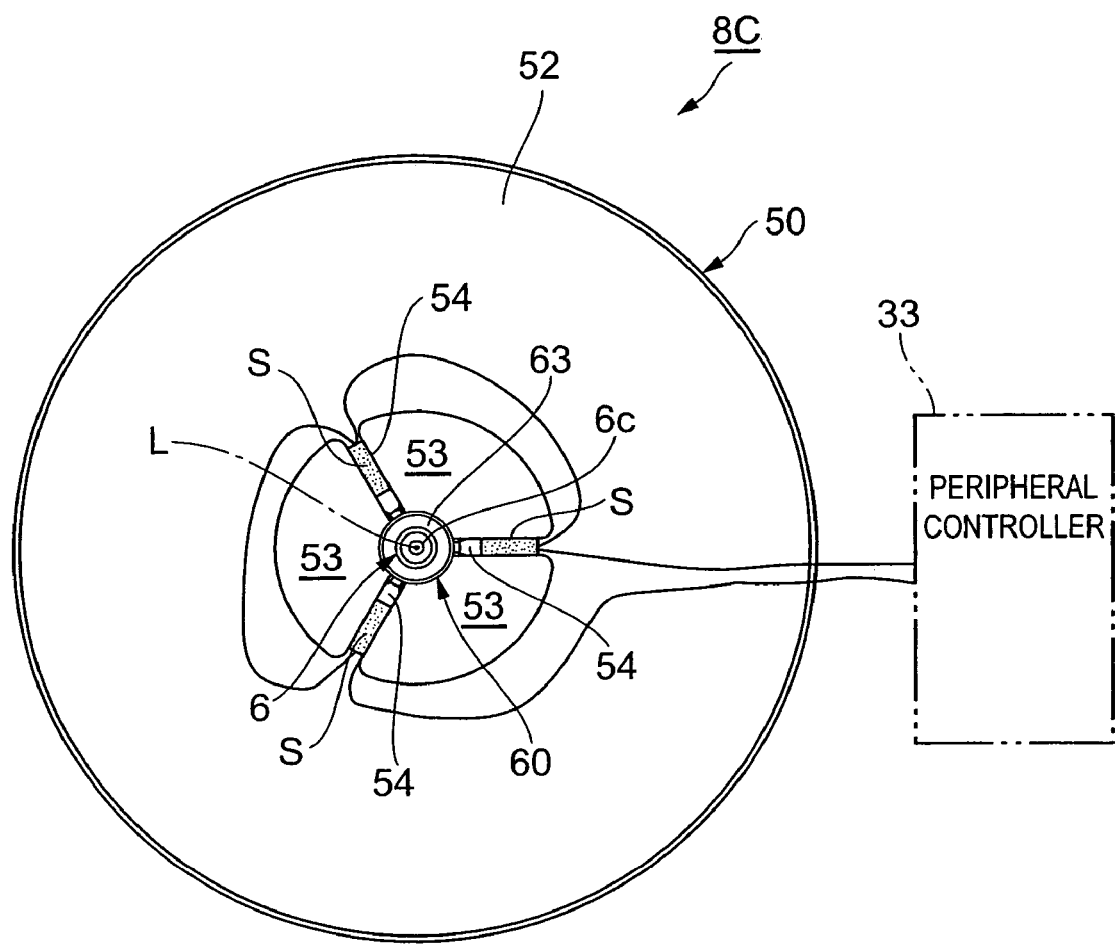
FIG. 6 is a bottom view of the solid immersion lens holder according to the third embodiment.

FIG. 6 is a bottom view of solid immersion lens holder 8C according to the third embodiment. FIG. 6 shows a state in which the solid immersion lens holder 8C holds a solid immersion lens 6.

The configuration of the solid immersion lens holder 8C is different from the configuration of the solid immersion lens holder 8A shown in FIG. 3, in that the solid immersion lens holder 8C has three stress detection sensors S, S, S. The solid immersion lens holder 8C will be described with focus on this point.

A stress detection sensor S is stuck onto each connecting part 54 and detects the stress exerted through the lens holding part 60 on the connecting part 54 during observation of the semiconductor device 11, as described in the second embodiment. The stress detection sensors S can be, for example, strain gages.

The stress detection sensors S are electrically connected through the peripheral controller 33 to the instructor 42 (cf. FIG. 1), and the instructor 42 terminates the inspection with the semiconductor inspection apparatus 1 when the stress detected by the stress detection sensors S exceeds a predetermined stress. More specifically, the instructor 42 suspends the operation of the XYZ stage 7 by the peripheral controller 33 to terminate the adjustment of the observation position, focusing, and so on.

This can suspend such operations as position adjustment of the solid immersion lens 6 before damage to the semiconductor device 11 due to pushing of the solid immersion lens 6 or the like, whereby the semiconductor device 11 can be protected, as in the case of the second embodiment. Namely, the solid immersion lens holder 8C has the configuration for protecting the semiconductor device 11 as an observation object, thanks to the possession of the stress detection sensors S.

The effect of the configuration wherein the lens holding part 60 extends in the direction of the optical axis L of the objective lens 21 is much the same as in the case of the first embodiment. There are no particular restrictions on the setting locations of the stress detection sensors S as long as they can detect the stress exerted on the lens holding part 60.

Fourth Embodiment

Figure 7:
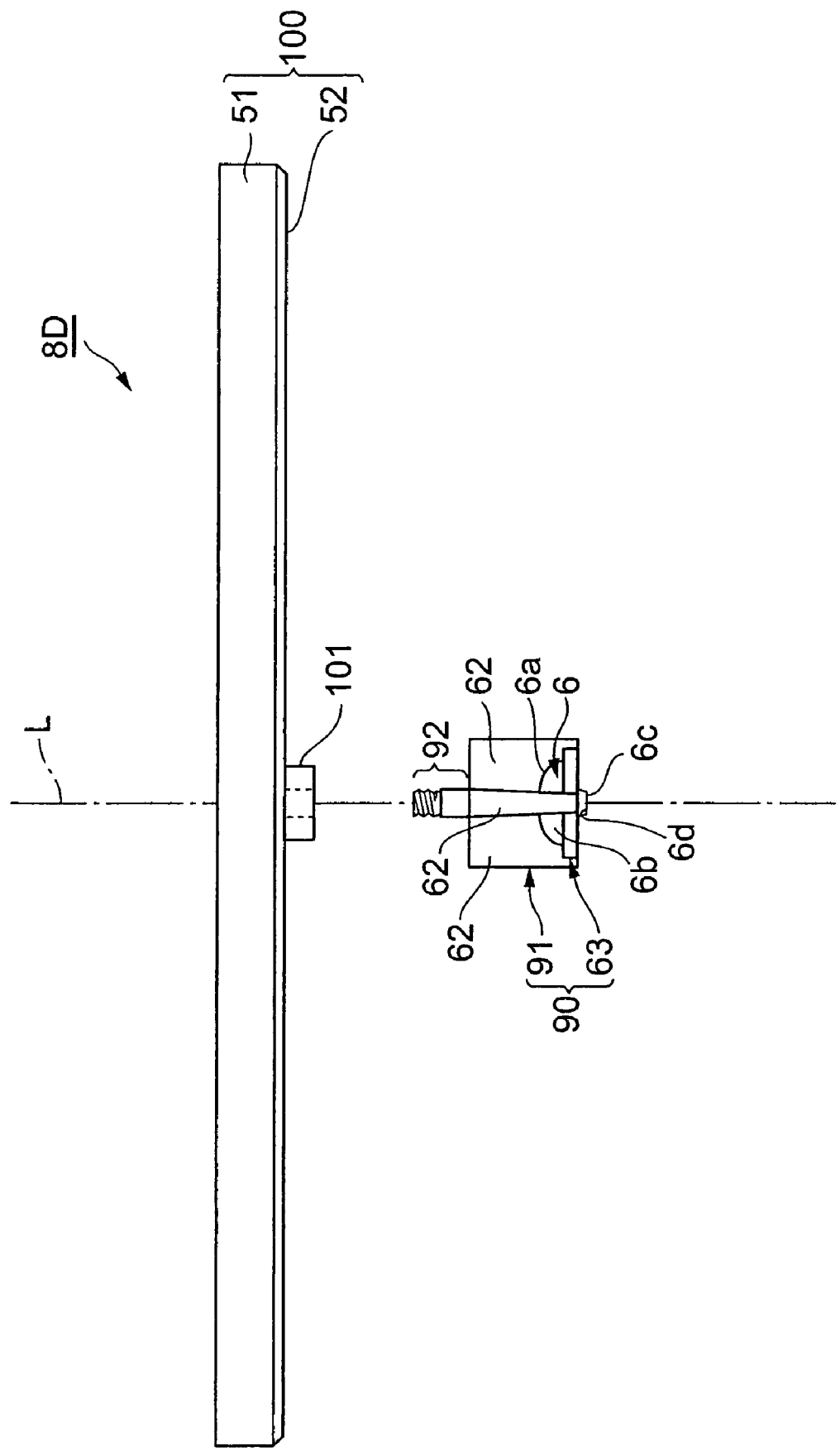
FIG. 7 is an exploded side view of the solid immersion lens holder according to the fourth embodiment.

FIG. 7 is an exploded side view of solid immersion lens holder 8D according to the fourth embodiment. FIG. 7 shows a state in which the solid immersion lens holder 8D holds a solid immersion lens 6.

The configuration of solid immersion lens holder 8D is mainly different from the configuration of the solid immersion lens holder 8A shown in FIG. 3, in that the lens holding part 90 is detachably attached through the bottom plate 52 of the base part 100 to the base part 100. The solid immersion lens holder 8D will be described with focus on this point.

The holding member 91 forming the lens holding part 90 has a projection 92 on the bottom plate 52 side of the base part 100. The bottom plate 52 has a boss 101 to engage with the projection 92, at the intersection among the three connecting parts 54, 54, 54 (cf. FIG. 3). In the solid immersion lens holder 8D, therefore, the lens holding part 90 can be connected to the base part 100 through engagement of the projection 92 with the boss 101.

In this configuration the lens holding part 90 can be attached to and detached from the base part 100, whereby the solid immersion lens 6 can be readily changed in a state in which the base part 100 is mounted through the objective lens socket 9 on the objective lens 21.

The holding member 91 extends in the direction of the optical axis L as the holding member 61 shown in FIG. 3 does, and the effect of the configuration wherein the holding member 91 extends in the direction of the optical axis L is much the same as in the case of the first embodiment; it is feasible to observe the object up to a region closer to the peripheral part 11a of the semiconductor device 11.

Fifth Embodiment

Figure 8:
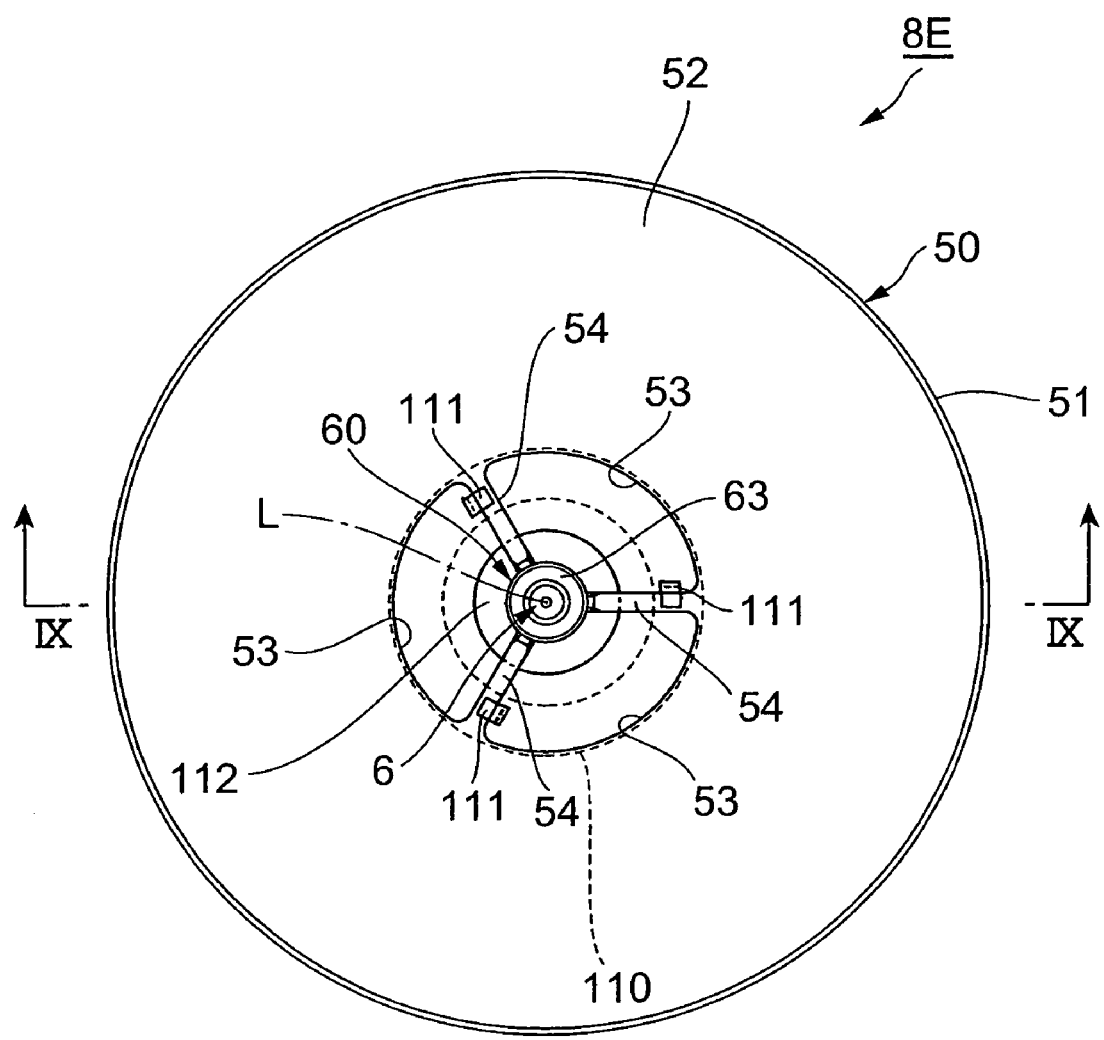
FIG. 8 is a bottom view of the solid immersion lens holder according to the fifth embodiment.
Figure 9:
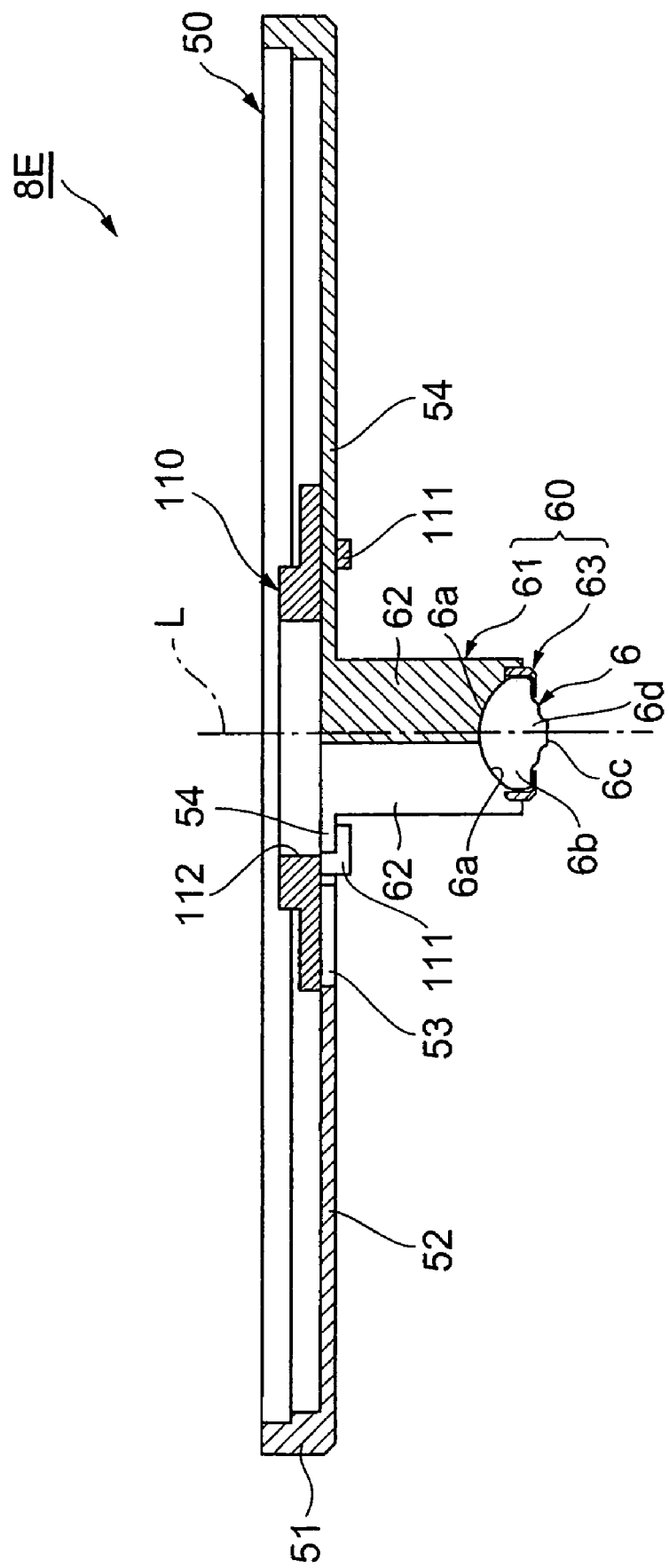
FIG. 9 is a sectional view along line IX-IX in FIG. 8.

FIG. 8 is a bottom view of solid immersion lens holder 8E according to the fifth embodiment. FIG. 9 is a sectional view along line IX-IX in FIG. 8. FIGS. 8 and 9 show a state in which the solid immersion lens holder 8E holds a solid immersion lens 6.

The configuration of the solid immersion lens holder 8E is different from the configuration of the solid immersion lens holder 8A shown in FIG. 3, in that the solid immersion lens holder 8E has a diaphragm 110 for limiting a light beam passing the base part 50. The solid immersion lens holder 8E will be described with focus on this point.

The outer shape of the diaphragm 110 is of a disk shape and is attached to the base part 50 by engaging three hooks 111, 111, 111 of approximately L-shape provided on the bottom surface of the diaphragm 110 (the surface on the base part 50 side), with corresponding connecting parts 54, 54, 54. The diaphragm 110 is arranged concentrically with the center of the base part 50 and is located on the upper surface side of the bottom plate 52. The diaphragm 110 restricts the beam passing through the apertures 53 of the base part 50, by a circular aperture 112 formed in the central region thereof.

Since the diaphragm 110 is attached to the base part 50 by engaging the hooks 111 with the connecting parts 54 as described above, it is attachable to and detachable from the base part 50. For this reason, by preparing a plurality of diaphragms 110 with different sizes of aperture 112, it is feasible to adjust the size of the beam passing the base part 50. By adjusting the size of the aperture 112 of the diaphragm 110 in this manner, the NA of the beam incident to the semiconductor device 11 can be varied, so that the semiconductor device 11 can be observed with any desired NA.

In the semiconductor device, for example, where a plurality of layers with different refractive indices are stacked between the surface in contact with the solid immersion lens 6 and the observation position through the solid immersion lens 6, total reflection can occur between layers, depending upon the NA of the beam incident to the semiconductor device, and the light can fail to adequately arrive at the desired observation position. In addition, the totally reflected light can pass through the solid immersion lens 6 and objective lens 21 to enter the high-sensitivity camera 3, so as to degrade the image.

In contrast to it, the present embodiment is configured to adjust the NA of the beam incident to the semiconductor device 11 by the diaphragm 110 as described above, whereby the light can securely arrive at the desired observation position, without occurrence of total reflection between layers. In this case, the totally reflected light between layers is prevented from again entering the objective lens 21 through the solid immersion lens 6, whereby the semiconductor device 11 can be observed as a sharper image. It is also possible to provide a liquid crystal diaphragm instead of the diaphragm 110.

The effect of the configuration wherein the lens holding part 60 extends in the direction of the optical axis L is much the same as in the case of the first embodiment, and it is feasible to observe the object up to a region closer to the peripheral part 11a of the semiconductor device 11.

Sixth Embodiment

Figure 10:
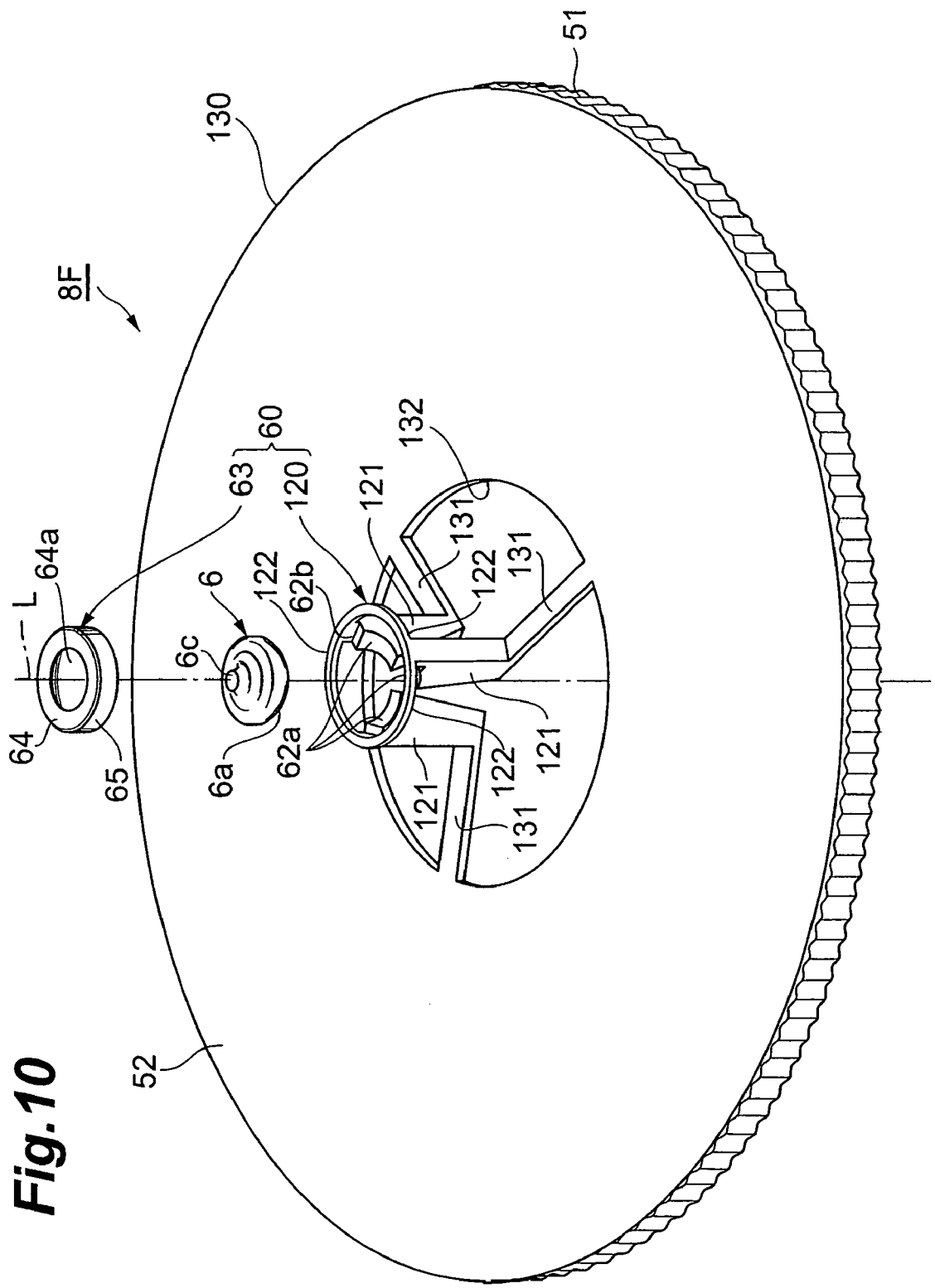
FIG. 10 is an exploded perspective view of the solid immersion lens holder according to the sixth embodiment.

FIG. 10 is an exploded perspective view of solid immersion lens holder 8F according to the sixth embodiment. FIG. 10 shows a case in which the solid immersion lens holder 8F holds a solid immersion lens 6.

The configuration of the solid immersion lens holder 8F is mainly different from the configuration of the solid immersion lens holder 8A shown in FIG. 3, in that three holding pieces 121, 121, 121 of holding member 120 are arranged apart from the center line L of the holding member 120. The solid immersion lens holder 8F will be described with focus on this point.

Each holding piece 121 is radially arranged with respect to the center line L of the holding member 120 passing the center of the base part 130 and is located an equal distance apart from the center line L. Each holding piece 121 extends from an end of each connecting part 131 and in a direction substantially perpendicular to the base part 130 (i.e., in the direction of the optical axis L). The holding pieces 121 adjacent to each other are coupled by a connecting member 122 of arcuate shape integrally formed with the holding pieces 121. For this reason, the positional relation among three holding pieces 121, 121, 121 is securely fixed. Each holding piece 121 has a lens receiving surface 62a and a claw 62b at the end portion thereof as the holding piece 62 shown in FIG. 3 did.

In this configuration, the three holding pieces 121 are not connected on the center line L and the connecting parts 131 do not intersect at the center of the bottom plate 52 (the center of the base part 130) in the base part 130, either. For this reason, the three apertures 53 shown in FIG. 3 are communicated with each other at the center of the bottom plate 52 (the center of the base part 130) to form one aperture. In other words, the solid immersion lens holder 8F has a circular aperture 132 formed as centered on the center of the bottom plate 52, and is configured so that the bottom plate 52 is coupled to the ends of the holding pieces 121 located in the aperture 132, by the connecting parts 131 extending from the peripheral part of the aperture 132 toward the center and shorter than the radius of the aperture 132.

In the solid immersion lens holder 8F having the configuration as described above, the light entering and leaving the upper surface 6a of the solid immersion lens 6 is further prevented from being blocked by the holding pieces 121, whereby the light beam can be effectively utilized. Since the light can pass the center and surroundings of the base part 130 and through the interior of the holding member 120, more image information can be acquired from the semiconductor device 11.

Since the light is also allowed to pass the region near the center line L of the lens holding part 60 in the solid immersion lens holder 8F as described above, it is preferable to adopt the configuration wherein the holding pieces 121 are formed so that the distance from the center line L to each holding piece 121 decreases from the base part 130 side toward the solid immersion lens 6 side, as shown in FIG. 10, in terms of effective utilization of the beam.

The present embodiment adopted the configuration wherein the holding pieces 121 adjacent to each other were coupled by the connecting member 122, but it is also possible to adopt a configuration without the connecting member 122, because the holding pieces 121 adjacent to each other are also coupled by the lens cover 63 fixed to the claws 62b formed in the holding pieces 121.

The effect of the configuration wherein the lens holding part 60 having the holding member 120 and lens cover 63 extends in the direction of the optical axis L is much the same as in the case of the first embodiment, and it is feasible to observe the object up to a region closer to the peripheral part 11a of the semiconductor device 11.

Seventh Embodiment

Figure 11:
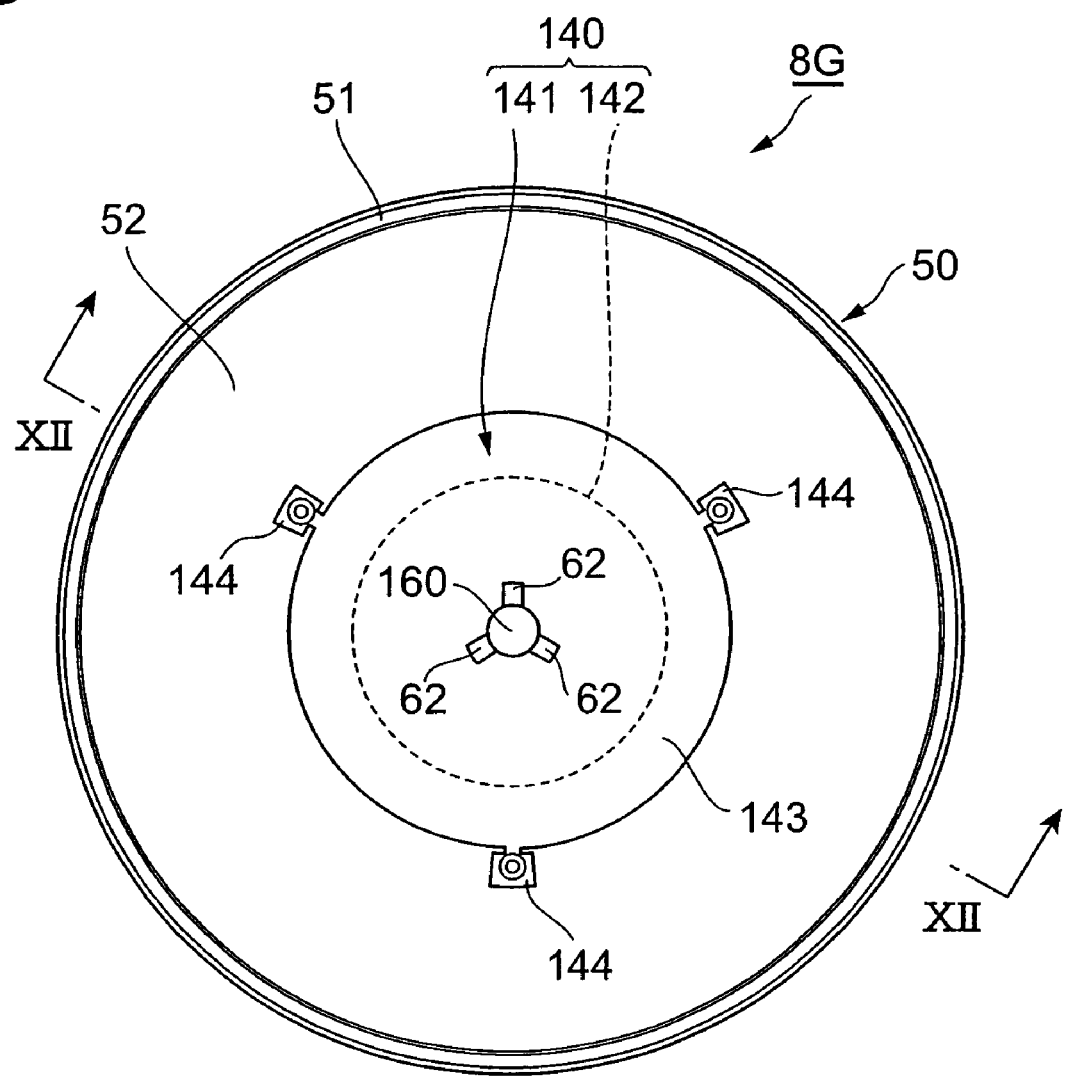
FIG. 11 is a view of the solid immersion lens holder of the seventh embodiment from the objective lens side.
Figure 12:
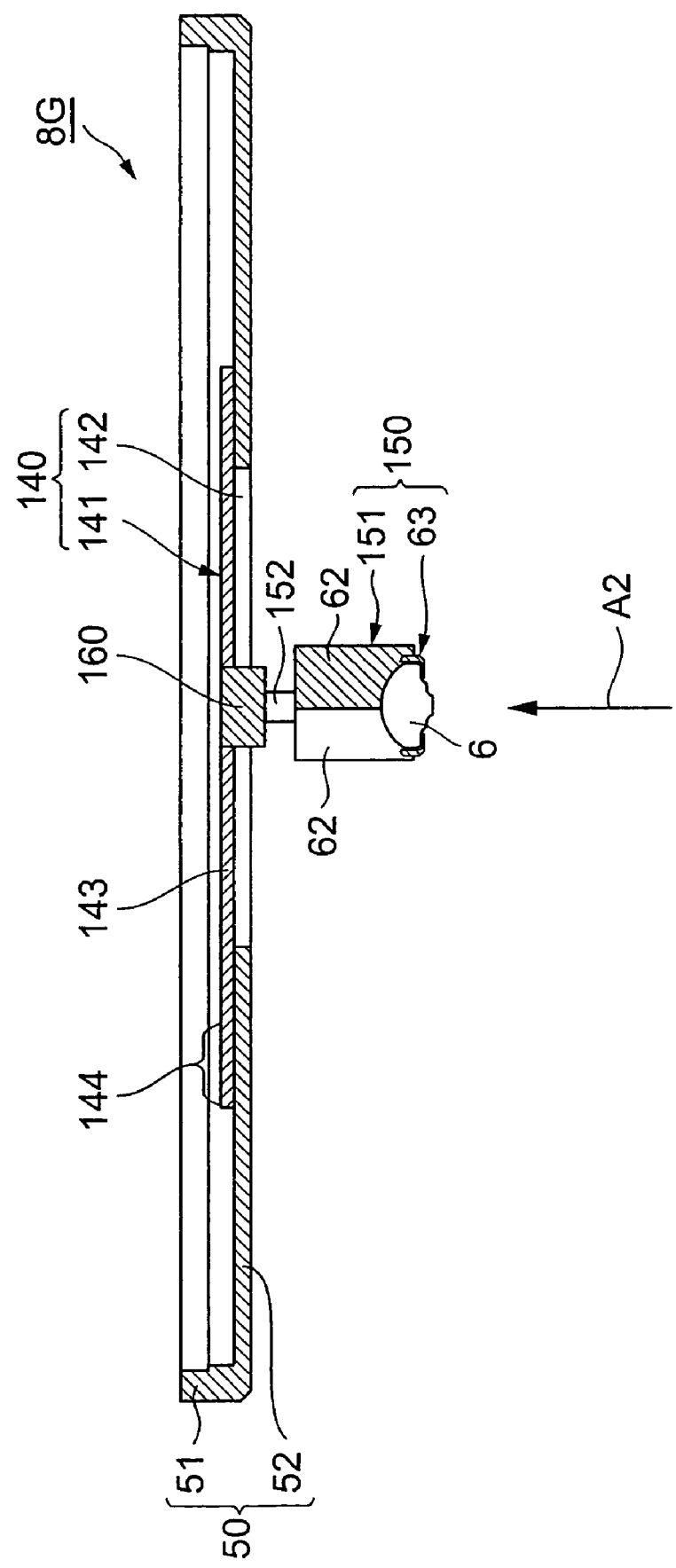
FIG. 12 is a sectional view along line XII-XII in FIG. 11.

FIG. 11 is a view of solid immersion lens holder 8G according to the seventh embodiment, from the side of objective lens 21. FIG. 12 is a sectional view along line XII-XII in FIG. 11.

Figure 13:
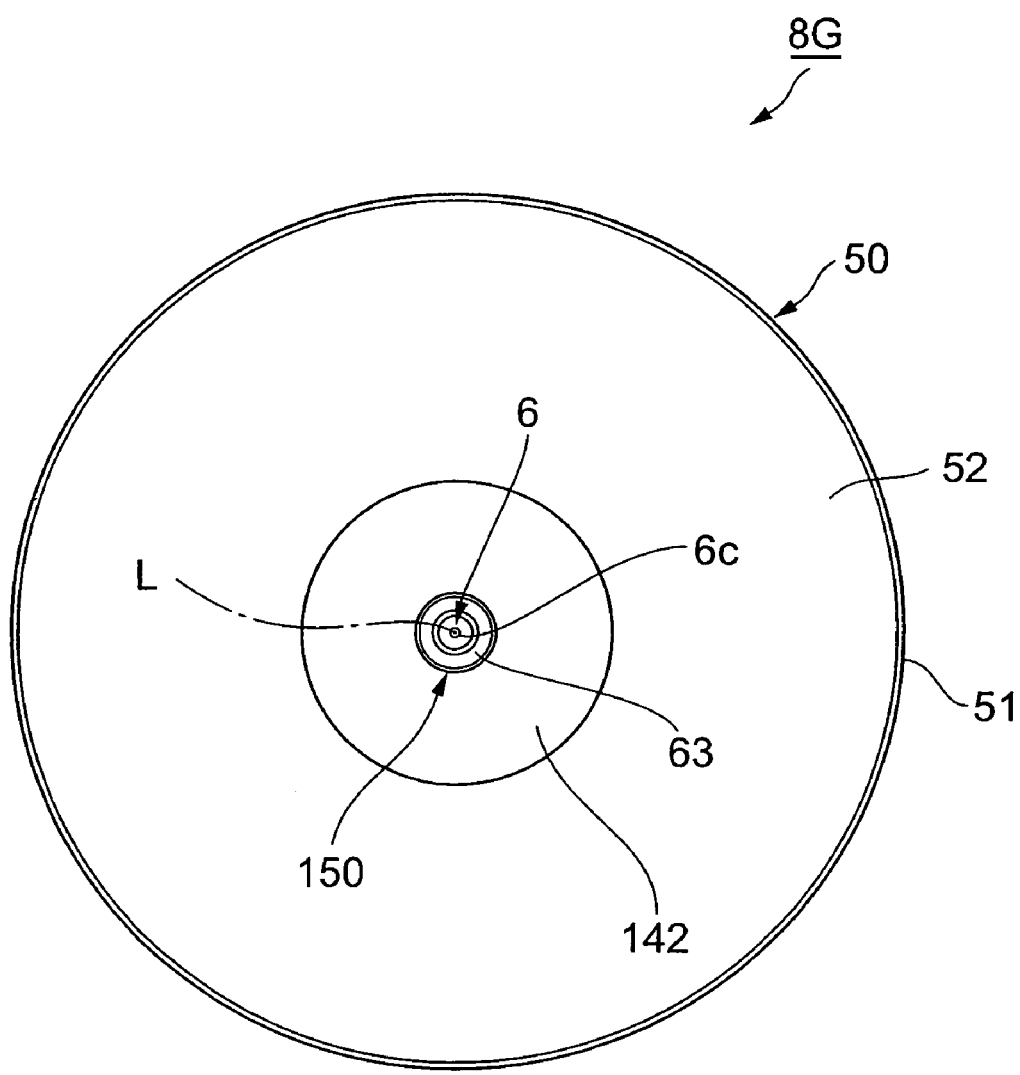
FIG. 13 is a view of the solid immersion lens holder shown in FIG. 12 from a direction of arrow A2 in FIG. 12.

FIG. 13 is a view of the solid immersion lens holder 8G from a direction of arrow A2 in FIG. 12. FIGS. 11 to 13 show a state in which the solid immersion lens holder 8G holds a solid immersion lens 6.

The configuration of the solid immersion lens holder 8G is mainly different from the configuration of the solid immersion lens holder 8A shown in FIG. 3, in that the light passing portion 140 of the solid immersion lens holder 8G has a glass plate 141 as a light passing member. The solid immersion lens holder 8G will be described with focus on this point.

The light passing portion 140 is comprised of a circular aperture 142 formed concentrically with the center of the base part 50, and a glass plate 141 provided on the upper surface of the base part 50. The glass plate 141 has a glass plate body 143 of disk shape, and mount pieces 144 projecting in radial directions from the peripheral part of the glass plate body 143. The diameter of the glass plate body 143 of the glass plate 141 is larger than the diameter of the aperture 142. For this reason, when the glass plate 141 is placed so as to cover the aperture 142, the mount pieces 144 are located on the bottom plate 52 of the base part 50.

The glass plate 141 is fixed through the mount pieces 144 so that the center of the base part 50 is located on the center line L of the holding member 151. The width of the mount pieces 144 is narrowed in connecting part to the glass plate body 143.

A mount portion 160 of cylindrical shape to engage with a projection 152 of the holding member 151 of the lens holding part 150 is buried in the center of the glass plate 141. By engaging this mount portion 160 with the projection 152, the lens holding part 150 is attached to the glass plate 141. The relation of the mount portion 160 with the holding member 151 having the projection 152 is similar to the relation of the boss 101 with the holding member 91 of the solid immersion lens holder 8D in the fourth embodiment.

In the configuration of this solid immersion lens holder 8G the base part 50 and the lens holding part 150 are attachable to and detachable from each other, and thus the solid immersion lens 6 can be readily replaced with another even in a state in which the base part 50 is fixed to the objective lens 21.

Since the width of the mount pieces 144 is narrowed on the glass plate body 143 side, the glass plate 141 will break before damage to the semiconductor device 11 during position adjustment of the solid immersion lens 6, focusing, or the like, for the same reason as in the case of the solid immersion lens holder 8D shown in FIG. 5. As a result, the semiconductor device 11 is protected.

Furthermore, the aperture 142 can pass the beam in the region except for the mount portion 160 in the base part 50, whereby the blocking of the beam from the solid immersion lens 6 is further suppressed. As a result, the image of the semiconductor device 11 can be formed by more effectively utilizing the beam from the solid immersion lens 6.

The present embodiment adopts the configuration wherein the glass plate 141 is located on the objective lens 21 side of the base part 50, but it is also possible to adopt, for example, a configuration wherein the glass plate 141 has substantially the same shape as the aperture 142 and is fitted in the aperture 142. The lens holding part 150 was described to be detachable from and attachable to the base part 50 through the mount portion 160, but it may be arranged in a state in which it is always fixed to the base part 50. Each holding piece 62 may be buried directly in the glass plate 141.

The effect of the configuration wherein the lens holding part 150 extends in the direction of the optical axis L is much the same as in the case of the first embodiment, and it is thus feasible to observe the object up to a region closer to the peripheral part 11a of the semiconductor device 11.

The preferred embodiments of the present invention were described above, but it is noted that the present invention is by no means limited to the above embodiments. The configurations of the solid immersion lens holders 8A-8G according to the first to seventh embodiments can also be used in combination.

For example, the solid immersion lens holders 8D-8F according to the fourth to sixth embodiments may be configured so as to protect the observation object by narrowing the width of the connecting parts in part in each of them or by sticking the stress detection sensors onto the respective connecting parts. Furthermore, the solid immersion lens holders 8B-8C, 8E, 8F may be configured so that the lens holding part is detachably attached to the base part, as the solid immersion lens holder 8D is. In a further preferred configuration, the solid immersion lens holders 8B-8D, 8F, 8G are configured to have the diaphragm 110 as the solid immersion lens holder 8E is.

Each of the holding members 61, 91, 120, and 151 is comprised of the three holding pieces 62, 121, but there are no particular restrictions on the number of holding pieces 62, 121 as long as the solid immersion lens 6 can be stably received. Furthermore, where each of the solid immersion lens holders 8A-8G of the first to seventh embodiments was applied to the semiconductor inspection apparatus 1, the center line of the lens holding part 60, 90, 150 was arranged to agree with the optical axis L of the objective lens 21; however, they do not always have to agree with each other. In a potential configuration, the lens holding part 60, 90, 150 extends in the direction of the optical axis L and, for example, the center line of the lens holding part 60, 90 150 may be parallel to the optical axis L.

Furthermore, the first to seventh embodiments adopted the holding pieces as lens receivers, but the lens receivers are not limited to the platelike members. The solid immersion lens holders 8A-8G of the first to seventh embodiments are also suitably applicable, for example, to systems for observing objects like wafers. Furthermore, the solid immersion lens holders 8A-8G of the first to seventh embodiments were applied to the semiconductor inspection apparatus 1, but they are also applicable to systems for observing objects except for semiconductors.

The solid immersion lens holder according to the present invention can be applied as a solid immersion lens holder permitting observation up to a region closer to the peripheral part of the observation object even in the case where the observation object is placed in a recess.

What is claimed is:

1. A solid immersion lens holder comprising:
    a base part to be attached to an objective lens; and
    a lens holding part provided with the base part, extending in a direction of an optical axis of the objective lens, and holding a solid immersion lens at an end portion thereof,
    wherein the lens holding part holds the solid immersion lens so that light emerging from the solid immersion lens to the base part side travels through a region outside the lens holding part and toward the base part, and
    wherein the base part has a light passing portion which transmits the light emerging from the solid immersion lens to the base part side, toward the objective lens.

2. The solid immersion lens holder according to claim 1, wherein the lens holding part has:
    a holding member extending in the direction of the optical axis and receiving the solid immersion lens; and
    a lens cover provided at an end portion of the holding member and having an opening for exposing a bottom surface of the solid immersion lens to the outside,
    wherein the lens holding part houses the solid immersion lens between the holding member and the lens cover.

3. The solid immersion lens holder according to claim 2, wherein the holding member has a plurality of lens receivers for receiving the solid immersion lens.

4. The solid immersion lens holder according to claim 3, wherein the plurality of lens receivers are radially arranged with respect to a center line of the holding member.

5. The solid immersion lens holder according to claim 4, wherein the plurality of lens receivers are arranged apart from each other with respect to the center line of the holding member.

6. The solid immersion lens holder according to claim 2, wherein the lens holding part has a clearance with respect to the solid immersion lens.

7. The solid immersion lens holder according to claim 1, wherein the light passing portion is an aperture.

8. The solid immersion lens holder according to claim 7, wherein an end of the lens holding part on the base part side is located in the aperture, and
    wherein the base part has a connecting part for connecting the lens holding part to the base part.

9. The solid immersion lens holder according to claim 1, wherein the lens holding part is provided integrally with the base part.

10. The solid immersion lens holder according to claim 1, wherein the light passing portion has a light passing member.

11. The solid immersion lens holder according to claim 1, further comprising a diaphragm provided in the base part and arranged to limit a beam passing the light passing portion.

12. The solid immersion lens holder according to claim 1, which is configured so as to protect an observation object to be observed through the solid immersion lens, in accordance with a stress exerted on the solid immersion lens.

13. The solid immersion lens holder according to claim 1, further comprising a stress detection sensor for detecting a stress exerted on the solid immersion lens.

* * * * *